United States Patent [19]
Coniglio et al.

[11] 3,863,116
[45] Jan. 28, 1975

[54] NEW CAPACITOR CONSTRUCTION

[75] Inventors: James John Coniglio; Robert Emerson Wiley, both of Port Huron, Mich.

[73] Assignee: Acheson Industries, Inc., Port Huron, Mich.

[22] Filed: May 29, 1973

[21] Appl. No.: 364,750

[52] U.S. Cl. .............................................. 317/230
[51] Int. Cl. ............................................. H01g 9/05
[58] Field of Search ............ 317/230; 117/217, 218, 117/227

[56]  References Cited
UNITED STATES PATENTS

| | | | |
|---|---|---|---|
| 3,051,677 | 8/1962 | Rexford | 260/29.6 |
| 3,656,027 | 4/1972 | Isley | 317/230 |
| 3,675,087 | 7/1972 | Zykov et al. | 317/230 |

OTHER PUBLICATIONS

Acheson Industries, Inc., product data sheet for "Electrodag 405."

*Primary Examiner*—Rudolph V. Rolinec
*Assistant Examiner*—William D. Larkins
*Attorney, Agent, or Firm*—Harness, Dickey & Pierce

[57]  ABSTRACT

A new capacitor construction such as a tantalum capacitor which is capable of sustained operation at high temperatures and which possesses significantly improved electrical properties.

12 Claims, 1 Drawing Figure

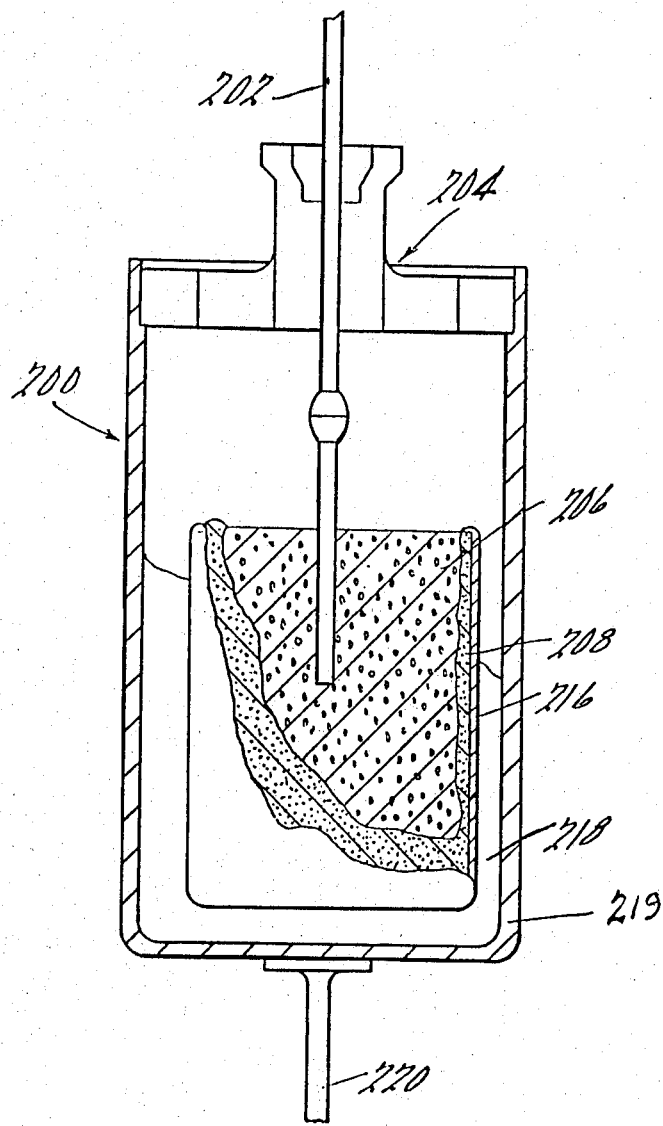

NEW CAPACITOR CONSTRUCTION

BACKGROUND OF THE INVENTION

This invention relates to an improved capacitor construction. More particularly this invention relates to an improved capacitor, such as a tantalum capacitor construction, wherein a special thermally stable coating composition is used in constructing the capacitor.

The state of the art is indicated by the following references: U.S. Pats. Nos. 3,573,230; 2,983,624; 3,025,185, 2,968,649; 3,132,124; 3,051,677; DuPont Viton Bulletin No. 16 "Solution Coatings of Viton" by J. M. Bowman; and, DuPont's "The Engineering Properties of Viton Fluoroelastomer; " and, Acheson Industries, Inc. product data sheet for "Electrodag 405."

It is a main object of this invention to provide a new and improved capacitor construction which includes a special thermally stable coating material as a part of its construction.

Another object of this invention is to provide an improved tantalum capacitor.

Another object is to provide a simplified fabrication technique for manufacturing capacitors.

Other objects, features, and advantages of the present invention will become apparent from the subsequent description and the appended claims taken in conjunction with the accompanying drawing.

BRIEF DESCRIPTION OF THE DRAWING

The drawing FIGURE illustrates in cross section a preferred embodiment of a capacitor construction in accordance with the invention.

SUMMARY OF THE INVENTION

Tantalum capacitors have been produced in the past wherein a resin bonded silver coating composition containing an acrylic resin binder was used. Such prior capacitors have had a maximum stable long term operating temperature limit of approximately 250° F. Above this temperature such capacitors were not reliable. One purpose of this invention is to provide a new capacitor construction which can operate at high temperatures, that is for example at a temperature in the range of 400° F–700° F, as this has generally not been possible with prior capacitors. The invention herein at least in part comprises employing thermally stable fluroelastomer containing coating compositions, which coating compositions readily wet the surface to which they are applied in fabricating the capacitor assembly, typically a graphite layer. This special coating composition herein described dries rapidly to form a coating which is notable for its ability to be wetted by the solder which is required for attachment of the conductor of the capacitor construction; and for its low dissipation factor at high frequency, for example at one megahertz; and for its thermal stability during the life of the improved capacitor construction.

DESCRIPTIION OF PREFERRED EMBODIMENTS

The drawing illustrates a preferred capacitor construction in accordance with the invention comprising a capacitor generally designated 200 which includes an anode lead 202 passing through and electrically insulated from a closure means 204 such that the anode lead communicates with the interior of the capacitor 200. The anode lead 202 is in electrical contact with a sintered tantalum powder anode 206 which has a conductive coating 208 thereon comprised for example of colloidal graphite coating.

A special thermally stable dispersion coating composition 216 overlies the coating 208. The exterior of the capacitor 200 is bonded with solder 218 to the coating 216, this being the cathode connection 218 which terminates through the can 219 in cathode lead 220. The special thermally stable dispersion coating 216 forming a part of the construction of capacitor 200 provides this capacitor with the highly useful and advantageous electrical properties as is explained herein.

The coating composition (for forming the layer 216) contains total solids within the broad range of about 5 percent to about 80 percent by weight of the total weight of the coating composition and, preferably the per cent solids is maintained within the range of about 45 percent to about 70 percent by weight.

The fluoroelastomer material used in the coating should be present within the broad range of about 5 percent to about 20 percent by weight of the coating solids and preferably from about5 percent to about 10 percent by weight. This fluoroelastomer material provides the special function of endowing the coating with high temperature resistance, that is, resistance to temperatures of about 400° – 700° F. The fluoroelastomer material used in the invention should be one which provides this high temperature resistance while at the same time possessing the property of being able to operate as an effective binder material for the applied coating. Particularly suitable materials for use as the fluoroelastomer herein may be described as vinyl/olefinic fluoroelastomeric polymers, vinyl-fluorocarbon elastomeric copolymers, vinylidene/fluoro-olefinic elastomeric polymers, and $C_2$–$C_4$ olefinic/fluorocarbon elastomeric polymers. A preferred material is the vinylidene fluoro/hexafluoropropylene copolymer. fluoroelastomer. Commercially available fluoroelastomers which may be used are Viton A or B, (DuPont trademark) and Fluorel FC-2170 or KF-2140 (3M Company trademark). Still further fluoroelastomers which may be used herein are described in U.S. Pat. Nos. 2,968,649, 3,051,677, and 3,172,124, the disclosures of which are incorporated herein by reference.

The conductive particle or pigment for use in the coating 216 should be present within the broad range of about 80 percent to about 95 percent by weight of the total solids of the coating and preferably this range should be from about 90 percent to about 95 percent by weight. Suitable pigments for use in the coating are various finely particulated pigments such as silver particles, copper particles, noble metal particles and alloys thereof, and silver coated particles. Silver particles are preferred.

The silver pigment preferably employed has a mesh size of about 90 percent through 325 mesh; and an apparent density of about 16–32 grams per cubic inch (Scott Volumeter).

The percentage of conductive pigment particles required in this coating composition should be above a minimum level as generally described above in order to obtain coatings to which solder will adhere readily. This is a function to some extent of the particle size and shape of the silver particles, and the particular fluoroelastomer material being used. When the conductive particle content, such as the silver particles, is over 95 percent the coatings appear to lose integrity and adhesion.

The flow control agent used in the coating may be present broadly within the range of zero up to about 10 percent by weight of the coating solids and preferably the flow control agent is present in the range of about 0.05 percent up to about 2 percent by weight of the coating solids. Particularly suitable materials for use as the flow control agent are finely divided materials selected from the group consisting of silicas and silicates. Specific materials for this case are Cab-o-sil and Bentone.

The solvent carrier material used for forming solutions or dispersions of the coating may satisfactorily be selected from any number of different solvents or blends thereof, such as methylethyl ketone, acetone, various other ketone type solvents, esters, dimethylformamide, and numerous other organic solvent materials. The solvent forms the balance of the coating composition when the coating is formulated in a solution having a total solids content between about 1 percent and 80 percent by weight solids with the solvent subsequently being driven off or evaporated leaving the applied coating.

A curing agent may optionally be used in the coating. For this purpose various amino type curing agents and the like may be used.

The coating composition herein is applied during fabrication of the capacitor and provides a surface to which an electrical lead can be readily soldered.

Resistance character of coating compositions such as 216 herein are evaluated by forming dried or cured coatings under uniform conditions, upon which the electrical resistance measurements can be made. It is convenient to deposit the coatings by use of a blade coating device which will form on a glass plate layers of predetermined thickness. Measurements herein have been made on a dry coating after curing for 10 minutes at 300° F.

The electrical characteristics of the coating compositions herein have been discovered to make them highly suitable for use in capacitor constructions.

The electrical resistance in the following examples was measured using a special fixture which gave data in ohms per square. The resistance measurement was made with a suitable precision milliohmmeter. These values demonstrate in a convenient manner the relative electrical conductivities of these materials.

EXAMPLE 1

| | Parts by Weight |
|---|---|
| Silver Pigment | 90.91 |
| Fluoroelastomer (Viton B) | 9.09 |
| Methyl Ethyl Ketone | 62.33 |
| | 162.33 |
| Resistance | 0.19 ohms per square at 1 mil thickness |
| Solderability | good |

EXAMPLE 2

| | Parts by Weight |
|---|---|
| Silver Pigment | 93.35 |
| Fluoroelastomer (3M FC-2170) | 6.65 |
| Methyl Ethyl Ketone | 66.68 |
| | 166.68 |
| Resistance | 0.15 ohms per square at 1 mil thickness |

EXAMPLE 1-Continued

| | Parts by Weight |
|---|---|
| Solderability | excellent |

EXAMPLE 3

| | Parts by Weight |
|---|---|
| Silver Powder | 93.35 |
| Fluoroelastomer (3M KF-2140) | 6.65 |
| Methyl Ethyl Ketone | 66.68 |
| | 166.68 |
| Resistance | 0.3 ohms per square at 1 mil thickness |
| Solderability | good |

EXAMPLE 4

| | Parts by Weight |
|---|---|
| Silver Powder | 95.0 |
| Fluoroelastomer (Viton B) | 5.0 |
| Methyl Ethyl Ketone | 35.7 |
| | 135.7 |
| Resistance | 0.12 ohms per square at 1 mil thickness |
| Solderability | very good |

EXAMPLE 5

| | Parts by Weight |
|---|---|
| Silver Powder | 93.35 |
| Fluoroelastomer (Viton B) | 6.65 |
| Methyl Ethyl Ketone | 23.34 |
| | 123.34 |
| Resistance | .152 ohms per square at 1 mil thickness |
| Solderability | Good |

EXAMPLE 6

| | Parts by Weight |
|---|---|
| Silver Powder | 90.32 |
| Fluoroelastomer (3M KF-2140) | 9.68 |
| Methyl Ethyl Ketone | 77.42 |
| | 177.42 |
| Resistance | .23 ohms per square at 1 mil thickness |
| Solderability | excellent |

All of the above coating examples were applied to a glass plate by a 3 mil "Bird" blade and cured 15 minutes at 300° F. All formulations were manufactured by appropriate ball or pebble milling techniques. All of the above coatings were applied in the conventional manner to tantalum slugs and then checked for dissipation factor. The impedance (in ohms) results from the material of Example 6 applied to tantalum slugs was 0.485 (at resonant frequency of tantalum capacitor and taken at ambient room temperature).

EXAMPLE 7

A tantalum capacitor is manufactured by first taking a tantalum wire and forming thereon a sintered tantalum slug which encapsulates one end of the tantalum wire. The tantalum riser wire is then welded to a fixture bar for further processing. During the sintering operation under oxidizing conditions a tantalum oxide layer forms coating the surface of tantalum in the slug. Following this, a manganese dixodie layer is formed on the slug by dipping the slug several times into a manganese nitrate solution and pyrolyzing to form an oxide layer. Next a graphite coating is applied by dipping in a 10 percent aqueous dispersion of Aquadag colloidal graphite; and, then air-drying. The special thermally stable coating composition in accordance with Example 1 hereinabove is applied as the next layer by dipping one or two times in a coating dispersion formed in accordance with Example 1 above, and then air-drying. Following this, a solder coating is applied by dipping in a molten solder bath. Lastly, a "canning" operation is carried out, for example, as shown in the drawing FIGURE; or, "potting" of the final capacitor construction may be carried out by dipping the capacitor in an epoxy potting composition after first attaching a lead wire to the solder.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. In a solid capacitor for providing electrical capacitance due to a dielectric component in the capacitor, the improved construction including an anode lead, a cathode lead, and at least one coating composition applied in said construction comprised of:
   about 5 percent to about 20 percent by weight of fluoroelastomer for providing the coating with thermal stability to temperatures of 400°–700° F.,
   about 80 percent to about 95 percent by weight of conductive pigment for providing conductivity to the coating, wherein said conductive pigment is a finely particulated material selected from at least one of the group consisting of noble metals and alloys thereof, silver, and copper particles, and
   zero to about 10 percent by weight of flow control agent facilitating application usage of the coating, and said coating being substantially free of flux residue and substantially free of amine curing agent.

2. The invention of claim 1 wherein, said coating composition enables operation at temperatures in the range of 400°–700° F.

3. The invention of claim 1 wherein, said capacitor is a tantalum capacitor.

4. The invention of claim 1 wherein, said fluoroelastomer is an elastomeric material selected from at least one of the group consisting of fluorinated and fluoro-chlorinated olefin polymers.

5. The invention of claim 1 wherein, said flow control agent means is a finely divided material selected from at least one of the group consisting of the silicas and silicates.

6. The invention of claim 1 wherein, said flow control agent means is present from about 0.05 percent to about 10 percent by weight of total solids.

7. The invention of claim 1 wherein, said fluoroelastomer is present from about 5 percent to about 10 percent by weight, said conductive pigment is present from about 90 percent to about 95 percent by weight.

8. An improved solid tantalum capacitor construction including a coating comprised of,
   about 5 percent to about 20 percent by weight of fluoroelastomer for providing the coating with resistance to temperatures of 400°–700° F.,
   about 80 percent to about 95 percent by weight of conductive pigment for providing conductivity to the coating, wherein saiid conductive pigment is a finely particulated material selected from at least one of the group consisting of noble metals and alloys thereof, silver, and copper particles,
   and zero to about 10 percent by weight of flow control agent for facilitating application usage of the coating,
   and said coating enables operation in a temperature range of 400°–700° F., and said coating being substantially free of flux residue and substantially free of amine curing agent.

9. The invention of claim 1 wherein, said conductive pigment is substantially of silver.

10. The invention of claim 1 wherein, said fluoroelastomer is a vinylidene fluoride/hexafluoropropylene copolymer material.

11. The invention of claim 9 wherein, said fluoroelastic is a vinylidene fluoride/hexafluoropropylene copolymer material.

12. The invention of claim 11 wherein, said conductive pigment is substantially of silver.

* * * * *

UNITED STATES PATENT OFFICE
CERTIFICATE OF CORRECTION

Patent No. 3,863,116  Dated January 28, 1975

Inventor(s) James John Coniglio and Robert Emerson Wiley

It is certified that error appears in the above-identified patent and that said Letters Patent are hereby corrected as shown below:

Column 1, line 59, "Descriptiion" should be --Description--; Column 2, line 21, "about5" should be --about 5--; Column 4, line 5, "Example 1-Continued" should be --Example 2--; Column 6, line 25, Claim 8, "saiid" should read --said--. Column 6, line 42 & 43, Claim 11, "fluoroelastic" should be --fluoroelastomer--.

Signed and Sealed this fourteenth Day of October 1975

[SEAL]

Attest:

RUTH C. MASON
Attesting Officer

C. MARSHALL DANN
Commissioner of Patents and Trademarks